Dec. 1, 1936.      O. S. CARTIER      2,062,740
COUPLING
Filed March 18, 1935      2 Sheets-Sheet 1
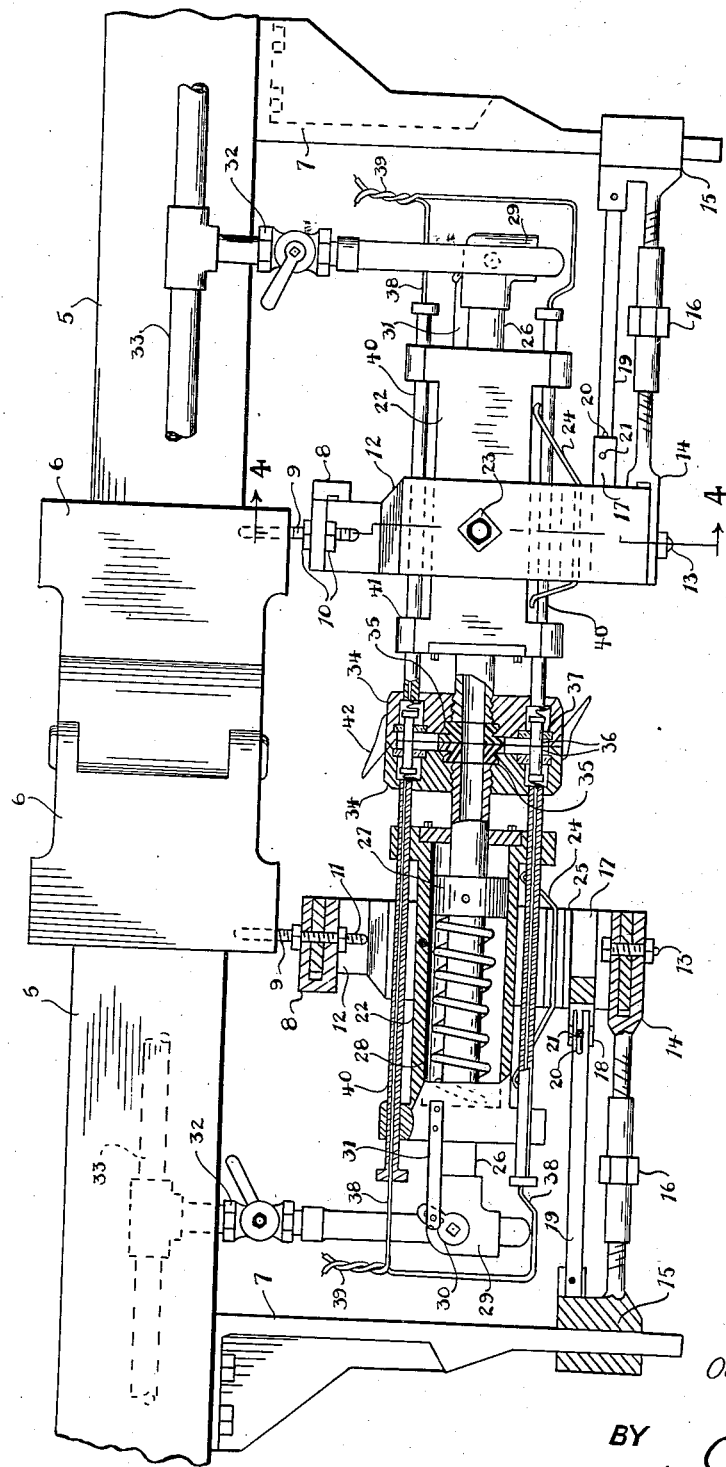
INVENTOR
Octave Sans Cartier
BY
ATTORNEY Dec. 1, 1936.   O. S. CARTIER   2,062,740
COUPLING
Filed March 18, 1935   2 Sheets-Sheet 2
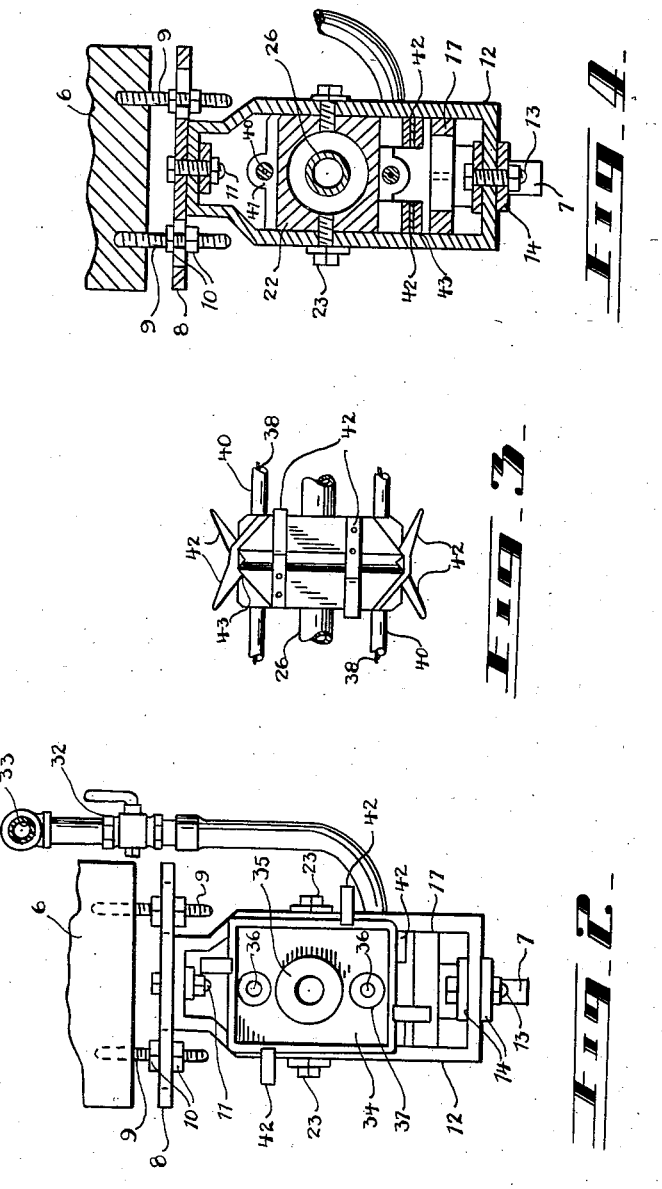
INVENTOR
Octave Sans Cartier
BY
ATTORNEY Patented Dec. 1, 1936

2,062,740

UNITED STATES PATENT OFFICE 2,062,740

COUPLING

Octave Sans Cartier, Ansonville, Ontario, Canada

Application March 18, 1935, Serial No. 11,547

7 Claims. (Cl. 213—76)

This invention relates to improvements in a coupling and appertains particularly to a coupling for railroad cars and the like having an automatic connection for the service lines such as the air hose, telephone line, electric wires, etc.

The principal object of the invention is to provide a car coupling carried by the usual draw bar and from which latter an adjustable frame is supported in which a compressible battery of service lines is mounted and held by spring pressure in normal position for engagement.

A further object of the invention is to provide a car coupling with automatic service line connections in which the compressible battery is carried by a frame that may be adjusted vertically, laterally and longitudinally with respect to its supporting draw bar so as to be properly aligned for engagement with a similar unit or another car unit and in which frame the battery of service line connections is universally mounted so that the same is free to teeter vertically or horizontally after connection as the adjoined cars round curves or vary their relative vertical relation.

A further object of the invention is the provision of a car coupling having service line connections automatically controlled by the coupling of the cars without any attention by an operator and which may be selectively cut off from such automatic control when the equipped unit of rolling stock is being coupled with units not so provided in which case the alternative usual connecting means that may also be carried are instantly available.

A still further object of the invention is the provision of a car coupling with automatic service line connections of the nature and for the purposes described that is characterized by structural simplicity, durability, efficiency and relative low cost of production whereby the same is rendered commercially desirable.

To the accomplishment of these and related objects as will become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1 is a sectional side elevation of coupling and connection of service lines of two cars equipped with my invention;

Figure 2 is an end elevation of the automatic connections on one car unit;

Figure 3 is a detail side elevation of the united heads; and

Figure 4 is a vertical transverse section (similar to Figure 2) taken on line 4—4 of Figure 1, looking in the direction indicated by the arrows.

Under the draw bar 5, of the usual coupling 6, this automatic connection for a battery of service lines is mounted. A bracket 7 depends near the inner end while a horizontal two deck swivel plate 8 is vertically adjustable below the forward or outer end by a laterally spaced pair of threaded studs 9 with a co-operating pair of nuts 10 on each. A king pin 11 through the center of this plate 8 supports a frame 12 whose bottom is held by an aligned king pin 13 between the arms of the forked forward end of a longitudinal rod 14, whose base or rear 15 connects with the lower end of the bracket 7 and which is formed in two sections connected and longitudinally adjustable by a left-right turnbuckle 16. A U-shaped member 17 bridges the side walls of the frame 12 and has a flaring slot 18 in its rear between which and the rear or base 15 of the rod 14 a strip of spring steel 19 is stretched, its rear end being anchored in the base 15 while the forward end is slotted as at 20 to move on the transverse connection pin 21.

A housing or cylinder 22 is carried in the frame 12 and is free to teeter on the horizontal pins 23 but is steadied or held in normal position by leaf springs 24 fastened in brackets 25 on the sides of the frame 12. These springs engage the bottom of the cylinder 22 near each end. A hollow pipe or stem 26 slides through this cylinder and projects out each end. A collar 27 is keyed thereon within the cylinder and a coil spring 28 is compressed between the collar and the closed rear end of the cylinder normally forcing the stem 26 forward. An L 29 with a 45° valve 30 on the projecting rear end of the stem 26, by virtue of connection by a bracket arm 31 with the cylinder 22, operates to open or close on the sliding of the stem and as the L 29 connects by a valved T 32 with the usual air line 33 the same is automatically opened on the compression of the stem 26 against the coil spring 28.

The connecting head 34, rigid on the forward end of the stem 26, appears as a rectangular block with an air-sealing cup-washer 35 surrounding the end of the air line opening and suitably spaced around it, as above and below, are spring mounted contacts 36 in insulated bearings 37 whose connecting wires 38 extend back beyond the cylinder 22, to carry off in a main 39. The wires 38 are enclosed in tubes 40 rigidly connected to the head 34 and slidable in bearings 41 on opposite ends of the cylinder housing. For accurately centering, steadying, and interlocking connected head 34, the same is provided with a plurality of bevelled spring fingers 42, preferably offset from center of top and sides and adapted to engage accommodating seats 43 in the adjoined head.

Having thus described the structure of the invention, brief reference is now made to its use and modus operandi: As two cars or other similarly equipped units of rolling stock are brought together and coupled, the engaging heads locate and align each other by the oppositely offset spring fingers that lock each other together as the heads press tightly, while at the same time the electric contacts engage, completing the telephone line and other electric lines and on the compression of the stems, as the heads lock, the air line valve is opened completing the automatic connection of all these services. Similarly on the uncoupling of the cars, the telephone, electric and other service lines are broken and the air line is automatically closed without any attention from the operator.

From the foregoing description taken in connection with the accompanying drawings, it will be manifest that a coupling is provided that will fulfill all the necessary requirements of such a device, but as many changes could be made in the above description and many apparently widely different embodiments of the invention may be constructed within the scope of the appended claims without departing from the spirit or scope thereof, it is intended that all matters contained in the said accompanying specification and drawings, shall be interpreted as illustrative and not in a limitative or restrictive sense.

Having thus described the invention, what is claimed as new and desired to secure by Letters Patent is:—

1. A coupling for automatically connecting service lines comprising in combination with a draw bar, a frame suspended therefrom and adjustable vertically, laterally and longitudinally with respect thereto, a housing carried by said frame and afforded a universal movement in conjunction therewith, resilient means for normally aligning said housing with the drawbar and a connecting head compressible toward said housing, adapted to align with, engage and lock on a companion head, said connecting head having a stem slidably supported in said housing and service line enclosing tubes slidably supported by said housing exteriorly thereof.

2. A service coupling, in combination with the usual draw bar, comprising a battery head in which the ends of various service lines are amassed, a reciprocable stem for said head and to which the usual air hose connects, a valve therein operable on the reciprocation of said stem, a universally movable cylinder for carrying said stem, a draw bar supported frame for said cylinder adjustable vertically, laterally and longitudinally of said draw bar, and means between said draw bar and frame for longitudinally aligning the latter with said draw bar and resilient means between said frame and cylinder for normally holding the latter horizontal.

3. A service coupling comprising in combination with a draw bar and coupling, a bracket depending from said draw bar, a horizontal swivel plate laterally and vertically adjustable beneath said coupling; a longitudinally adjustable rod extending forwardly from said bracket; a vertically pivoted frame supported by said plate and said rod, a cylinder horizontally pivoted between its ends in said frame, resilient means carried by said frame for horizontally centering said cylinder, a head for said service coupling adapted to engage a companion head, a stem for said head reciprocable in said cylinder against compression and connecting with the usual air hose, a valve in said air hose, and means engaging the same from said cylinder to cause its operation on the longitudinal movement of said stem.

4. In combination with claim 3, means supported from said bracket for longitudinally aligning said frame with said draw bar.

5. In combination with claim 3, means associated with said longitudinally adjustable rod and slidably connected with said frame for longitudinally aligning the latter with said draw bar.

6. In combination with the structure of claim 2, bearings at both ends both top and bottom of said cylinder, service lines reaching to said head and tubes for enclosing said service lines connected to said head and slidable in said bearings.

7. A coupling for automatically connecting service lines, comprising in combination with a drawbar, a frame suspended therefrom and adjusted vertically, laterally and longitudinally with respect thereto, a housing carried by said frame and afforded universal movement in conjunction therewith, resilient means for aligning said housing with the drawbar, a stem slidably supported in said housing, a connecting head on the end of said stem adapted to align with, engage and lock on a companion head and service line outlets massed in said connecting head, the services of which are adapted to be severally completed on the compression engagement of said head.

OCTAVE SANS CARTIER.